United States Patent
Bartholomä et al.

(10) Patent No.: US 8,690,599 B2
(45) Date of Patent: Apr. 8, 2014

(54) CABLE GLAND FOR A SHIELDED CABLE

(75) Inventors: Mario Bartholomä, Winden (DE); Fritz Zügel, Waldkirch (DE); Volker Götz, Kenzingen (DE); Achim Hoch, Waldkirch (DE)

(73) Assignee: Hummel AG, Denzlingen (DE)

( * ) Notice: Subject to any disclaimer, the term of this patent is extended or adjusted under 35 U.S.C. 154(b) by 92 days.

(21) Appl. No.: 13/500,959

(22) PCT Filed: Jul. 23, 2010

(86) PCT No.: PCT/EP2010/004525
§ 371 (c)(1),
(2), (4) Date: Jun. 20, 2012

(87) PCT Pub. No.: WO2011/042078
PCT Pub. Date: Apr. 14, 2011

(65) Prior Publication Data
US 2012/0252259 A1    Oct. 4, 2012

(30) Foreign Application Priority Data

Oct. 7, 2009   (DE) .................... 20 2009 013 522 U

(51) Int. Cl.
*H01R 13/58*    (2006.01)
(52) U.S. Cl.
USPC .......................................... 439/462; 439/98
(58) Field of Classification Search
USPC ......... 439/862, 860, 868, 883, 609, 578, 389, 439/92, 100, 462, 98
See application file for complete search history.

(56) References Cited

U.S. PATENT DOCUMENTS

| | | | | |
|---|---|---|---|---|
| 3,537,065 | A | * | 10/1970 | Winston .................. 439/584 |
| 3,709,289 | A | * | 1/1973 | Weatherston ............ 165/256 |
| 5,059,747 | A | * | 10/1991 | Bawa et al. ............. 174/655 |
| 5,278,352 | A | | 1/1994 | Schade |

(Continued)

FOREIGN PATENT DOCUMENTS

| | | |
|---|---|---|
| DE | 19738517 | 11/1998 |
| DE | 69631397 T2 | 12/2004 |

(Continued)

*Primary Examiner* — Neil Abrams
*Assistant Examiner* — Phuongchi T Nguyen
(74) *Attorney, Agent, or Firm* — Volpe and Koenig, P.C.

(57) ABSTRACT

A cable gland (1) for a shielded cable (2), including a threaded sleeve (9), a clamping insert (4) that engages therein, and a union nut (7) or pressure screw in the usual manner. The union nut or pressure screw act axially and radially upon an area of the clamping insert (4) protruding beyond the threaded sleeve (9) and radially deforms the clamping area or the clamping finger (6) of the clamping insert. The threaded sleeve (9) contains a contact device (10) having one or more contact fingers (11), which lie against the shielding of the cable (2) in a contacting manner in the working position. The contact device (10) includes a carrier or ring (13) that is arranged in the threaded sleeve (9) in the working position and that has the one or more resilient contact fingers (11), wherein the contact fingers (11) each have a deformable protrusion (14) adjacent to the carrier or ring (13) of the contact fingers in the axial direction, the deformable protrusion having a convex curvature or rectangular shape in the longitudinal section in the initial position, and in continuation thereof after a corresponding bend, the contact fingers extend approximately in the orientation direction of the cable (2), thus in the relative insertion direction of the cable.

13 Claims, 4 Drawing Sheets

(56) References Cited

U.S. PATENT DOCUMENTS

| | | | |
|---|---|---|---|
| 5,378,027 A * | 1/1995 | Gehring | 285/322 |
| 5,795,188 A * | 8/1998 | Harwath | 439/583 |
| 5,942,730 A * | 8/1999 | Schwarz et al. | 174/84 R |
| 5,951,327 A * | 9/1999 | Marik | 439/607.44 |
| 6,162,995 A * | 12/2000 | Bachle et al. | 174/151 |
| 6,376,766 B1 * | 4/2002 | Bartholoma et al. | 174/354 |
| 6,639,146 B1 * | 10/2003 | Chiu | 174/359 |
| 6,679,724 B2 * | 1/2004 | Hillman et al. | 439/489 |
| 6,729,912 B2 * | 5/2004 | D'Addario | 439/675 |
| 6,749,454 B2 * | 6/2004 | Schmidt et al. | 439/350 |
| 7,781,685 B2 * | 8/2010 | Bartholoma et al. | 174/654 |
| 2013/0256467 A1 * | 10/2013 | Aumiller | 248/49 |

FOREIGN PATENT DOCUMENTS

| | | |
|---|---|---|
| EP | 0963020 A1 | 12/1999 |
| EP | 1783876 | 10/2006 |
| EP | 1526620 | 10/2007 |
| GB | 2056194 A | 3/1981 |
| GB | 2126803 | 3/1984 |

* cited by examiner

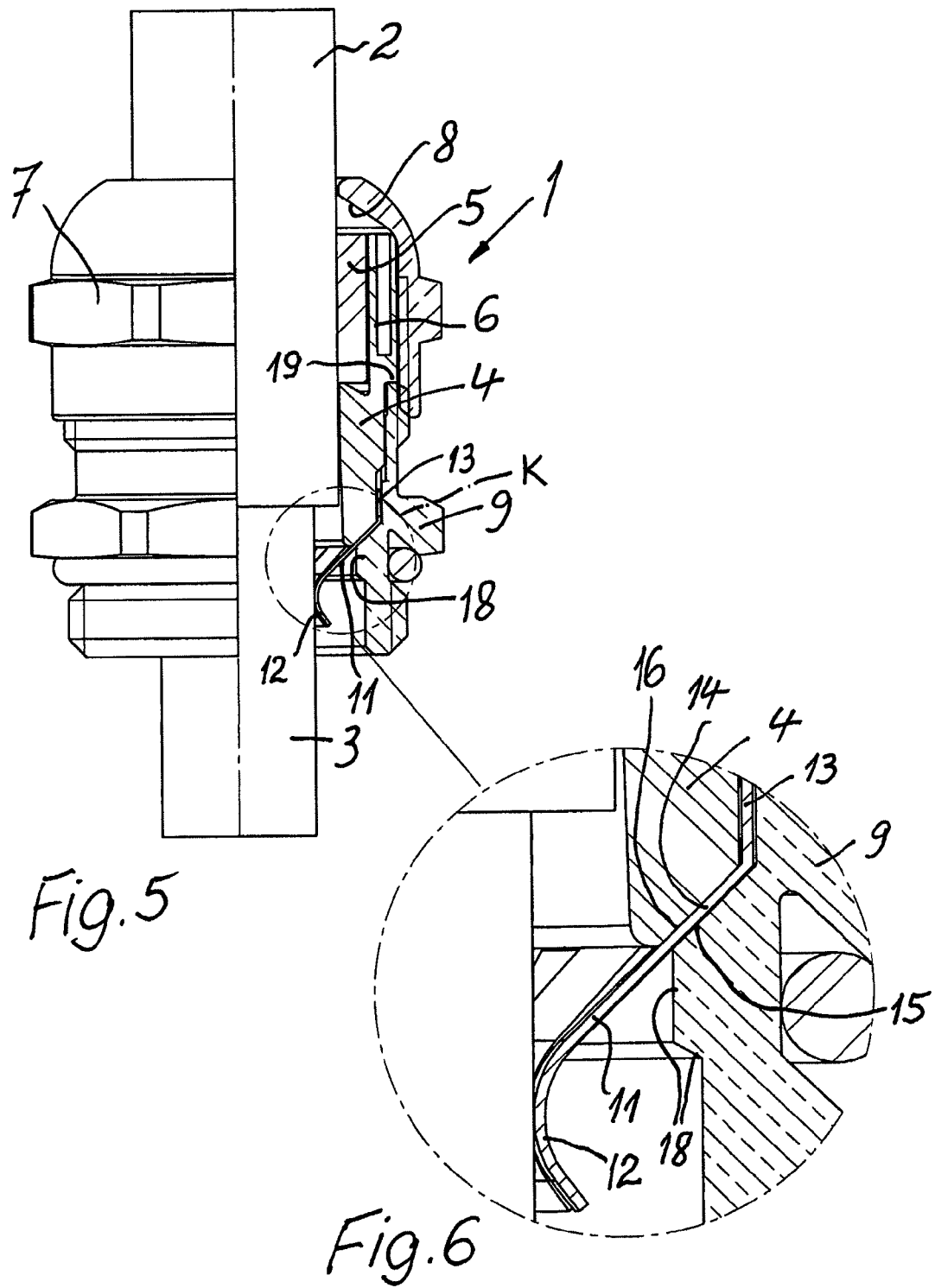

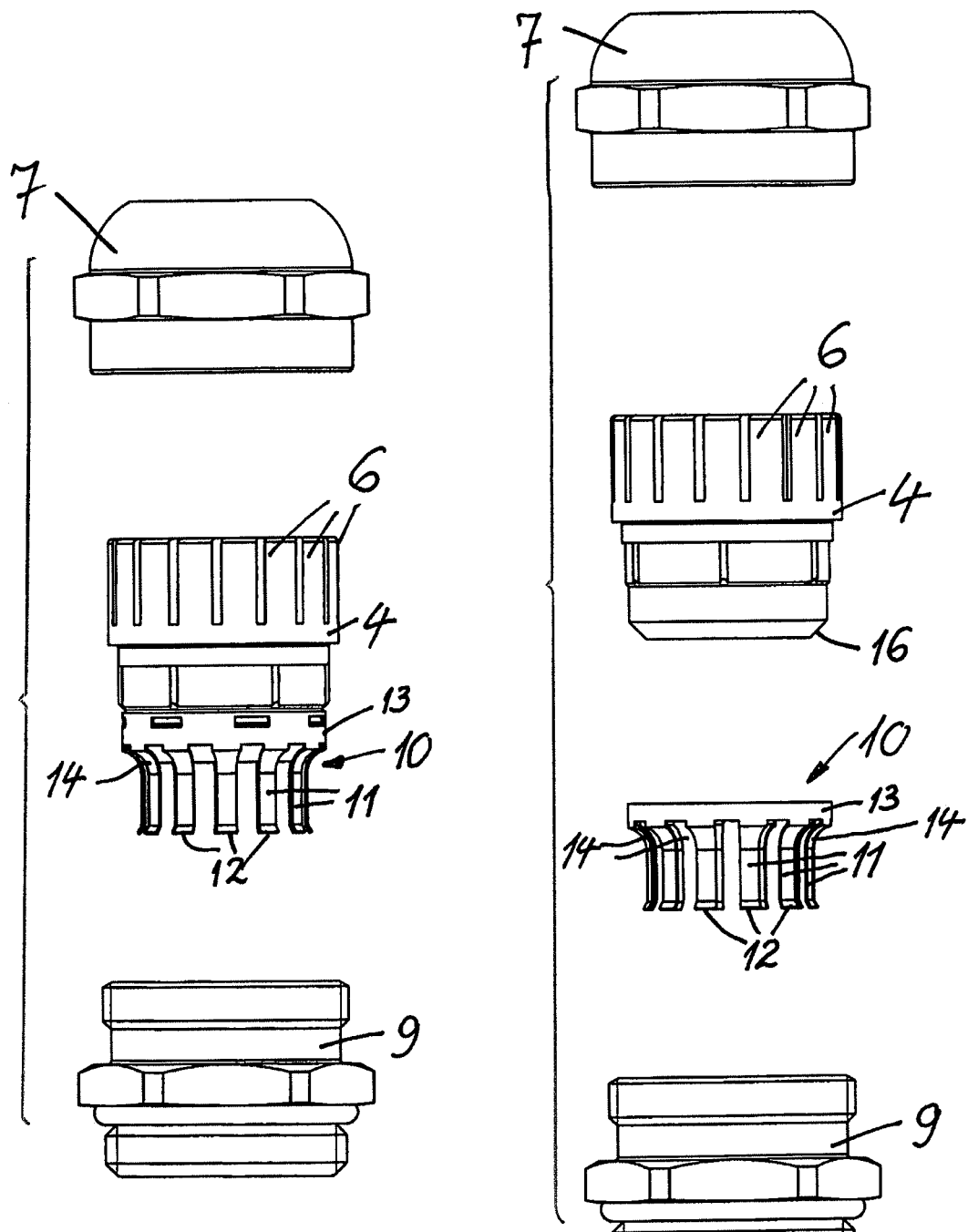

CABLE GLAND FOR A SHIELDED CABLE

BACKGROUND

The invention relates to a cable gland for a shielded cable, having a screw sleeve and having a clamping insert which engages in said screw sleeve, and also having a union nut or pressing screw for acting on the clamping insert in the axial and radial directions and for radially deforming the clamping region or clamping fingers of said clamping insert, with a contact device having at least one or having a plurality of contact fingers which are distributed over the circumference being provided in the screw sleeve, at least a portion of the longitudinal extent of said contact fingers bearing against the shielding of the cable in the use position.

A cable gland of this kind is known from EP 1 783 876 A2. The contact fingers provided in this document have, in the starting position, a shape and arrangement by means of which they project into the region of the cable in the relaxed state before the cable is inserted, so that they are pivoted radially outward against a restoring force and are bent by virtue of a connection being made with the cable. This restoring force leads to the contact fingers bearing against the outer face of the cable and therefore against the metal shielding which is present there, and establishing a contact-connection. The force of this contact-connection therefore depends on the diameter of the cable, that is to say contact is made with a relatively thin cable only with a weaker force than is the case for a relatively thick cable, and also mounting is difficult because the cable has to be pushed through the region of these contact fingers with friction or, conversely, the contact fingers have to be pushed over the cable, this possibly leading to damage. Furthermore, removal is difficult because the contact fingers may possibly have a barb-like effect on the cable surface and the shielding which is present there and is often in the form of a net and could be destroyed in the event of the cable being pulled out.

A further cable gland is described in EP 1 526 620 B1. In the solution provided in that document, the contact fingers are deformed and pressed against the outer face of the cable by the axial adjustment of the clamping insert when the union nut is tightened. To this end, an additional part in the form of a supporting element is required inside the screw sleeve, said additional part serving as an abutment for the contact fingers which have to be moved relative to this supporting element by means of their holder, this requiring a relatively large movement for the clamping insert primarily in the case of thin cables.

SUMMARY

Therefore, the object is to provide a cable gland of the type mentioned in the introductory part in which the usual axial movement of the clamping insert when it is locked to the cable itself is sufficient to create a sufficient degree of deformation of and contact-pressure force on the contact finger or fingers which, however, are at or re-establish a distance from the cable when the clamping insert is detached on account of the restoring force.

In order to achieve this object, the cable gland defined in the introductory part is characterized in that the contact device has at least one support or ring, which is arranged in the screw sleeve, and at least one or more resilient contact fingers which proceed from said support or ring and, adjacent to the support or ring in the axial direction, have a deformable projection having a convex curvature or an angled form in longitudinal section in the starting position, and, in a continuation from said projection, run approximately in the insertion direction of the cable, and in that a stop surface, which runs radially inward and, in the process, in the insertion direction of the cable in a manner inclined or obliquely with respect to said cable, for the projection of the contact finger or fingers is provided in the region of the projection and engages beneath said projection against the direction of action of the union nut or pressing screw, and in that the clamping insert or a pressing ring which is acted on by said clamping insert has, on that end face which faces the projection of the contact finger/fingers, a pressing surface which is arranged obliquely to the longitudinal center axis of the cable gland and by virtue of which, when the clamping insert is acted on in the axial direction and pushed in, the curved or angled projection of the contact finger can be acted on on that side thereof which is averted from the stop surface, and can be deformed in such a way that it can be moved closer to or pressed against the oblique stop surface, as a result of which the free part of the contact finger/fingers which continues the projection can be pivoted radially inward in the direction of the longitudinal center axis of the cable gland and can be pressed against an inserted cable.

On account of the two oblique surfaces, specifically firstly the stop surface within the screw sleeve and secondly the oblique surface which interacts with the clamping insert or is provided on said clamping insert, are therefore at a distance from one another in the starting position, said distance being reduced as a union nut or screw sleeve is tightened. This is used to deform the interposed deformable projection of the contact device such that the contact fingers proceeding from said projection are moved and pressed against the cable. This movement is the result of the projection being curved with respect to the stop surface which forms part of the screw sleeve, with the distance being at its greatest approximately in the center of this oblique stop surface on account of this curvature or else an angled shape, so that pressing with the aid of the clamping insert forcibly pivots the contact fingers, which are situated at the end of the oblique stop surface, radially inward.

Therefore, a relatively short adjustment movement between the clamping insert and the stop surface is sufficient to pivot the contact finger or fingers toward the cable in the desired manner, without the contact device having the contact fingers having to be axially adjusted itself. An axial adjustment of the clamping insert even by a small amount of fractions of just one or a few millimeters may be sufficient for the desired adjustment given a corresponding shape of the deformable projection.

The oblique stop surface can be provided on an inner ring and/or on a protrusion or collar of the screw sleeve which is connected fixedly or even integrally to the screw sleeve at least in the axial insertion direction of the cable. This prevents buckling or axial displacement of the oblique stop surface. Integral formation on the inner face of the screw sleeve also prevents an additional part, which could possibly become lost, having to be arranged in the cable gland.

The oblique pressing surface for acting on the curved or angled projection can expediently be directly integrally formed on the end face of the clamping insert. As already mentioned, a pressing ring could also be inserted between the clamping insert and the projection, but attaching the oblique pressing surface directly against the end face of the clamping insert obviates the need for an additional part.

The oblique stop surface and/or the oblique pressing surface can be straight or curved in longitudinal section. In this case, a straight design is the simplest to produce, but a concave or convex curvature could improve the effectiveness of the deformation of the projection depending on which of the two oblique surfaces is chosen to be provided with a convexity or a concavity, it also being possible for these curvatures of the longitudinal sections of the oblique surfaces to be in the form of polygons.

An expedient embodiment can make provision for the oblique stop surface and the oblique pressing surface to be arranged annularly circumferentially and parallel to one another. This then results in a distance between these oblique surfaces, which is constant over the circumference, being reduced by the union nut being tightened and pivoting the contact finger or fingers toward a cable. In this case, the size of this pivot movement can be varied by the degree of proximity of the two oblique surfaces, so that it is possible to adapt to cables of different thicknesses in a simple manner. The thinner the cable, the closer to one another the two oblique surfaces have to be brought, this, however, also corresponding to the fact that, in the case of a relatively thin cable, the union nut has to be tightened over a relatively large axial extent in order to achieve the desired clamping effect. Therefore, the pivoting of the contact finger or fingers is also adapted automatically depending on the thickness of the cable. In this case, a distance, which is provided in the starting position, can possibly likewise be reduced between a projection of the clamping insert, which engages in the screw sleeve, and the end face, which is located on the side of the union nut, of the screw sleeve, it being possible for the clamping insert and the screw sleeve to make contact when the union nut is extremely tight, if the deformation of the projection of the clamping device is intended to be limited. However, the distance between the end face of the screw sleeve and the projection of the clamping insert is expediently of such a size that the greatest possible deformation of the projection can still be carried out.

It is expedient when the contact fingers, in a continuation of the curved or angled projection, run in a straight line and, in particular, parallel to the longitudinal center axis of the cable gland in the starting position. In an advantageous refinement, they can therefore be arranged approximately on an imaginary cylinder and also parallel to one another in the starting position, with the internal dimension of this cylinder being equal to or preferably larger than the external dimension of the cable, so that said cable can be inserted without problems in the first instance or the cable gland can be plugged onto said cable without any friction or excessive friction occurring between the cable outer face and the contact fingers.

The free ends of the contact fingers can be deformed, angled or bent away from the longitudinal center of the cable gland. This results in good contact by the contact finger or fingers even when the contact finger or fingers is/are pivoted relative to the surface of a cable, with the free end faces of the ends of the contact fingers not being pressed into the cable surface.

The support or ring which has the contact fingers can be in the form of a lug or in the form of a sleeve which connects the contact fingers to one another and which is fastened to or mounted in the region of the clamping insert which faces it in front of the oblique stop surface and in front of the oblique pressing surface in the insertion direction of the cable. Therefore, it is possible to plug the ring or the sleeve, which is fitted with the contact fingers, for example onto the clamping insert in its end region which is adjacent to its end face which has the oblique pressing surface. This facilitates mounting because the clamping insert can then be inserted into the screw sleeve together with this support or ring of the contact fingers.

The ring or support which is fitted with the contact fingers can be connected to the clamping insert by a clamping and/or latching and/or snap-action connection or by adhesive bonding. Therefore, when the clamping insert is inserted into the screw sleeve, said ring or support is sufficiently firmly held to automatically be moved to its use position by this process of inserting the clamping insert.

In a modified embodiment, the clamping insert could have a coaxial or concentric groove in its end region which faces the support of the contact fingers, which groove accommodates the support or ring, which is fitted with the contact fingers, in a clamping manner or latching manner or by means of a snap-action connection in particular. This would provide even better preassembly of the contact device.

The ring or the lug having the contact fingers can be flat before mounting and can be inserted into the cable gland in the manner of a ring when mounted. Therefore, it may be a stamped part which forms a flat blank and obtains its annular shape as a result of being mounted.

Primarily, combining individual or several of the above-described features and measures results in a cable gland having a projecting clamping insert which is preferably composed of electrically non-conductive material and having contact fingers which are comprised of electrical material and can be pressed against a pre-inserted cable and the shielding of said cable as a result of the union nut or pressing screw of the cable gland being tightened, without movable ring parts or supporting elements being additionally required within the cable gland.

BRIEF DESCRIPTION OF THE DRAWINGS

In the text which follows, exemplary embodiments of the invention are described in greater detail with reference to the drawings, in which, in some cases schematically:

FIG. 5 is an illustration, which corresponds to FIGS. 1 and 3, of the cable gland according to the invention after the union nut has been tightened and the resulting axial relative adjustment between the clamping insert and the screw sleeve, as a result of which the convex curvature or the angled form of the deformable projection of the contact device is straightened and moved toward the oblique stop surface or pressed against said stop surface, and the cable is clamped, FIG. 6 is an illustration, which corresponds to FIGS. 2 and 4, of the deformation and bending of the deformable projection and the associated bending pivoting movement of the contact fingers radially inward toward the shielded portion of the cable in its clamped position, FIG. 7 shows the individual parts of the cable gland according to the invention before they are put together and assembled, with an electrically conductive contact device having contact fingers being combined with and connected to a clamping insert which is not electrically conductive, and FIG. 8 is an illustration, which corresponds to FIG. 7, in which the contact device having the contact fingers is a loose individual part which can be inserted into the cable gland when said cable gland is put together.

DETAILED DESCRIPTION OF THE PREFERRED EMBODIMENTS

Figures 1, 2:
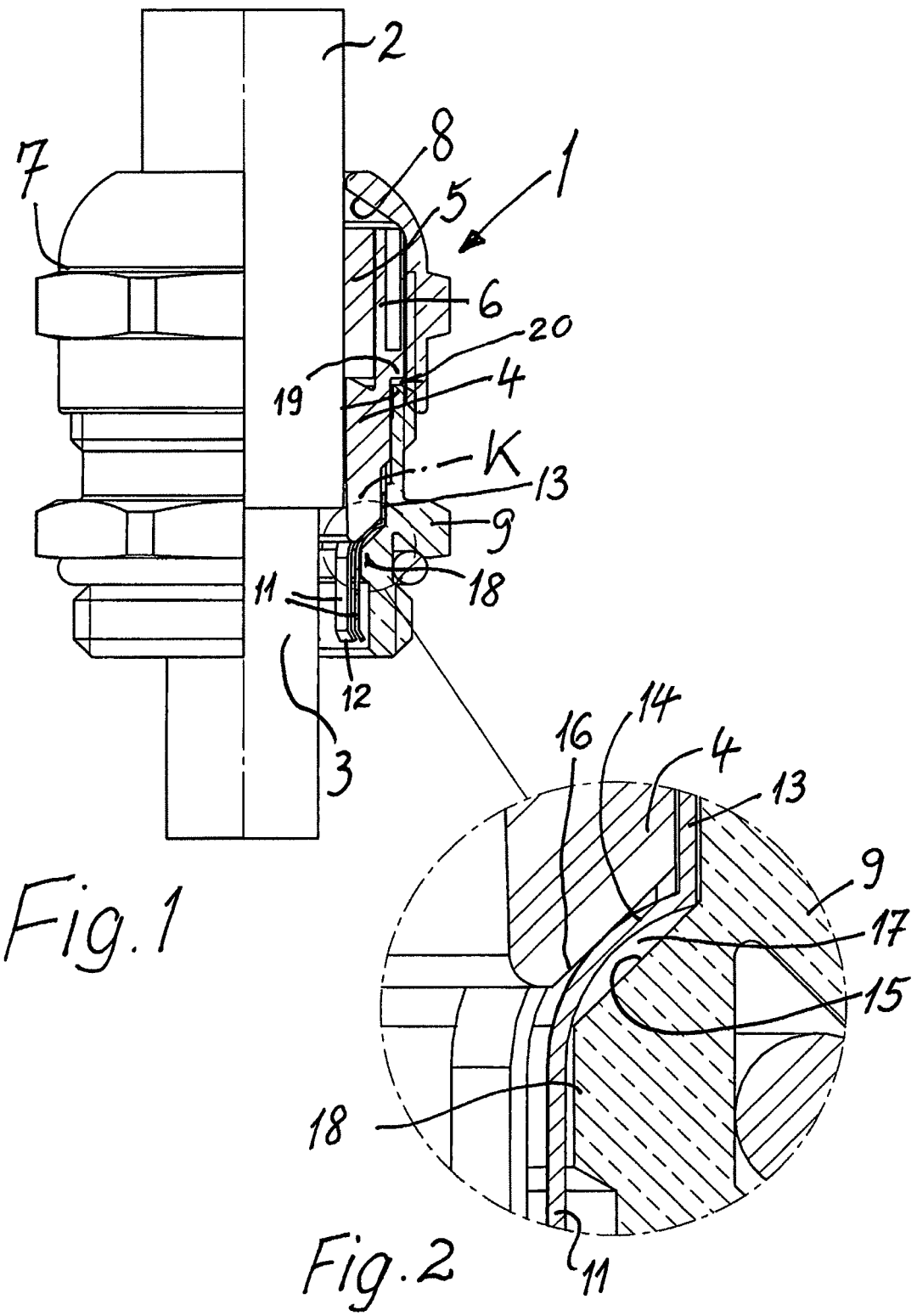
FIG. 1 shows a cable gland according to the invention which is shown partly in longitudinal section and partly in a side view and has a cable inserted, a region of said cable being stripped of insulation in such a way that its shielding is exposed, before a union nut is tightened and the clamping region of a clamping insert is pressed and contact fingers press against the shield.
FIG. 2 shows, on an enlarged scale, that region of the screw sleeve of the cable gland which is identified by a dash-dotted circle K in FIG. 1 and has an oblique stop surface arranged there and has a similarly beveled end face of the clamping region and also has a deformable projection which is situated between them, is part of the contact device, has a convex curvature in longitudinal section in the starting position and is at a distance from the oblique stop surface in accordance with its curvature in said starting position.

In the following description of different exemplary embodiments, parts which have corresponding functions are provided with corresponding reference numerals, even if their shape has been modified.

A cable gland, which is designated 1 in its entirety, serves to clamp and secure a shielded cable 2, in which a region 3 with the shielding screen is exposed, said region being arranged in an axial continuation of the clamping region and a clamping insert 4 and also a seal 5 which interacts with said clamping insert.

A union nut 7, which presses the clamping region or the clamping fingers 6 and the seal 5 radially against the cable 2, and clamps said cable, by way of an inner conical surface 8, which is arranged in the region of the passage of the cable 2, as said inner conical surface is axially adjusted, is provided for acting on the clamping insert 4 in the axial and radial directions and for radially deforming the clamping region, which faces away from the region 3, or the clamping fingers 6 of said clamping insert. In this case, said union nut 7 can be rotated relative to the external thread of a screw sleeve 9 by way of its internal thread in a known manner, this producing the required relative axial movement at the same time.

A contact device, which is designated 10 in its entirety and is illustrated separately once again in FIGS. 7 and 8, is provided in the screw sleeve 9, said contact device having a plurality of contact fingers 11 which are distributed over its circumference and, in the use position, over the circumference of the cable 2 or its projection 3 and which, according to FIGS. 5 and 6, bear against the region 3 containing the shielding of the cable 2 by way of a portion of their longitudinal extent, specifically an angled or rounded contact end 12, in the use position.

Figures 3, 4:
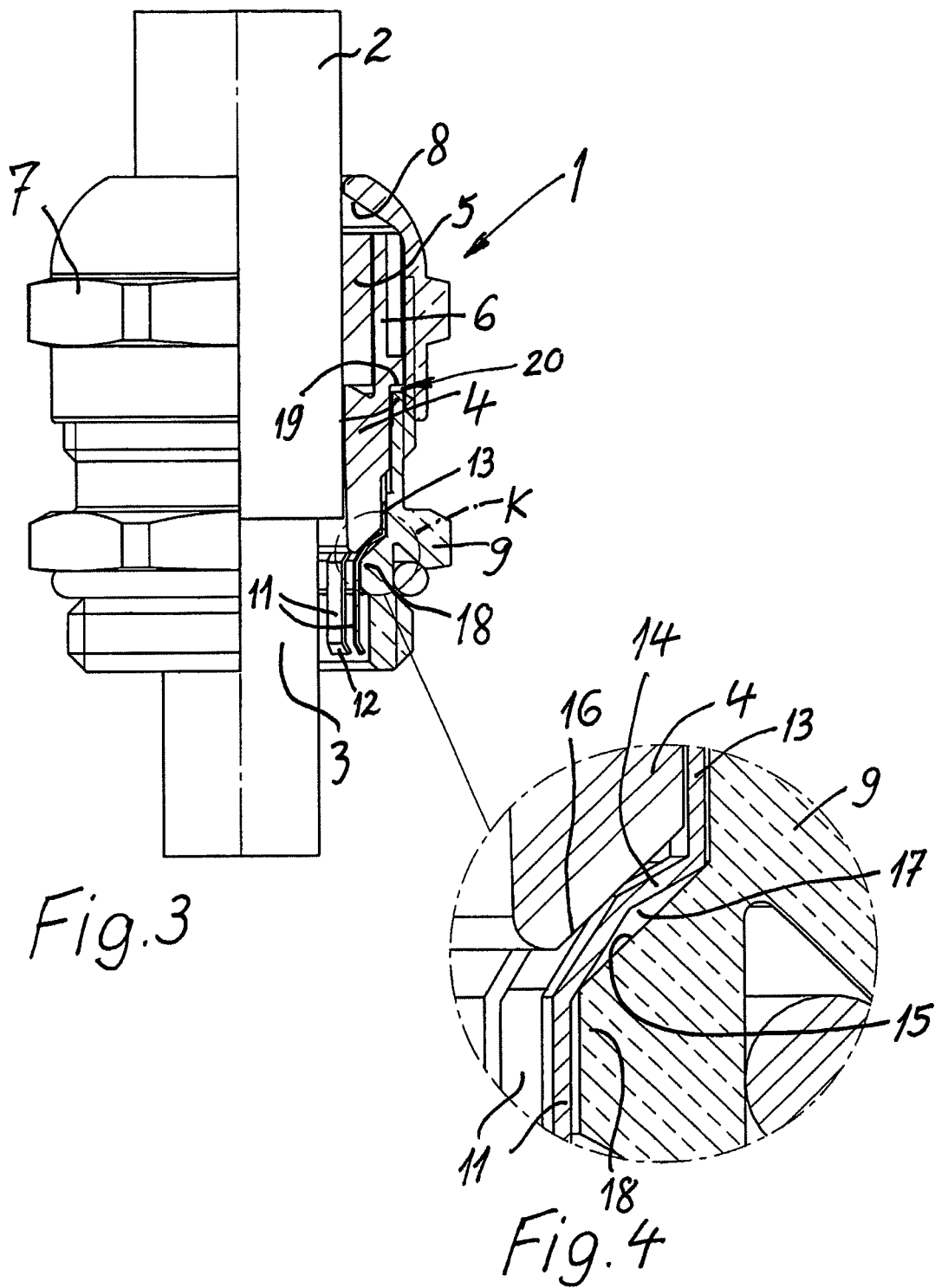
FIG. 3 is an illustration, which corresponds to FIG. 1, of a modified embodiment of the cable gland according to the invention.
FIG. 4 is an enlarged illustration, which corresponds to FIG. 3, of the modified embodiment, in which the deformable projection has an angled form in longitudinal section and as a result is likewise initially at a distance from the oblique stop surface in this starting position.

Primarily FIGS. 7 and 8, but also FIGS. 2 and 4 in conjunction with said FIGS. 7 and 8, show that the contact device 10 has a support or ring 13 which is arranged in the screw sleeve 9 and has resilient contact fingers 11 which proceed from said support or ring 13 and, adjacent to the support or ring 13 in the axial direction, have a deformable projection 14, with each of these projections 14 of the contact fingers 11 having, according to FIG. 2, a convex curvature or, according to FIG. 4, an angled form in longitudinal section in the starting position. In a continuation from said projection, the contact fingers 11 run substantially in a straight line and initially approximately parallel to the cable 2 and its region 3 approximately in the insertion direction of the cable 2.

A stop surface 15 for the projection 14 of the contact fingers 11, which stop surface runs radially inward and, in the process, in an inclined or oblique manner to the cable in the insertion direction of said cable, is arranged in the screw sleeve in the region or at the point where the deformable projection 14 is in the use position within the screw sleeve 9, this being clearly shown when looking at FIGS. 1 to 6 together. In this case, provision is also made for this stop surface 15 to engage beneath or behind the projection 14 against the direction of action of the union nut 7 on that side which is opposite the union nut.

Furthermore, FIGS. 1 to 6 show, and, from amongst these, FIGS. 2, 4 and 6 show particularly clearly, that the clamping insert 4 has a pressing surface 16, which is arranged obliquely to the longitudinal center axis of the entire cable gland 1, at that end face which faces and acts on the projection 14, with there being a distance between the pressing surface 16 and the stop surface 15 in the starting position before the cable 2 is secured, with the deformable projection 14 being located in the space created by said distance.

When the clamping insert 4 is acted on or pressed in in the axial direction with the aid of the union nut 7, the curved or angled projection 14 of the clamping fingers 11 is acted on on that side thereof which is averted from the stop surface 15, and is deformed between the stop surface 15 and the pressing surface 16 in such a way that it can be moved closer to or pressed against the oblique stop surface 15, as a result of which the free part of the contact fingers 11, which continues the projection 14, can be pivoted radially inward in the direction of the longitudinal center axis of the cable gland 1 and can be pressed against an inserted cable 2 or the shielding 3 of said cable (FIGS. 5 and 6).

In this case, the curved or angled region 14 according to FIGS. 2 and 4 in the exemplary embodiments is formed such that approximately the central zone bears against the pressing surface 16 or is arranged close to said pressing surface and has an intermediate spacing or is at a distance 17 from the stop surface 15. However, an inverse curvature or shape would also be possible, in the case of which the contact fingers 11 then require a further return bending movement toward said projection 14 at their free ends 12.

If the union nut 7 is tightened relative to the screw sleeve 9, that is to say also adjusted in the axial direction, this also leads to an axial adjustment of the clamping insert 4. As a result, the stop surface 15 and the pressing surface 16 are moved closer to one another and therefore the deformable region 14 is straightened to an increasing degree as the distance 17 is reduced. This necessarily leads to pivoting of the contact fingers 11 and their ends 12 in the radial direction onto the region 3, which has the shielding, of the cable 2.

In the illustrated exemplary embodiments, the deformable region 14 of the contact fingers 11 is at the distance 17 from the stop surface 15 in the starting position, makes contact with said stop surface at the edges thereof, and first can be contacted or is acted on by the pressing surface 16 when the union nut 7 or a pressing screw is tightened. As already mentioned, the deformable region 14 could, however, also be curved or angled in the opposite direction, so that it would be at the distance 17 from the pressing surface 16 in the starting position and first could be contacted or acted on by the stop surface 15 when the union nut 7 or a pressing screw is tightened.

In the exemplary embodiments, the oblique stop surface 15 is arranged on an inner projection 18 or ring or protrusion or collar of the screw sleeve 9 which is connected integrally to the screw sleeve 9 and projects radially inward in the exemplary embodiment. This provides a good abutment for the deformation of the projection 14 of the contact fingers 11. In the exemplary embodiments, the oblique pressing surface 16 is directly integrally formed on the end face of the clamping insert 4 which is averted from the clamping fingers 6 of this clamping insert 4. This results in a simple embodiment in which the axial action on the clamping insert 4, which takes place in any case when the union nut 7 is tightened, is used to slightly axially adjust this clamping insert 4 in order to thus straighten the deformable projection 14 and to pivot the contact fingers 11 radially inward.

In the exemplary embodiments, the oblique stop surface 15 and the oblique pressing surface 16 are straight in longitudinal section, but could also have a longitudinal section or profile which differs from a straight line. For example, that one of the two oblique surfaces which first makes contact with the deformable projection 14 could be somewhat convex, in order to provide even more effective deformation. The second oblique surface could possibly be concave in this case in order to permit a greater pivoting movement of the contact fingers 11. The straight design according to the exemplary embodiments is a good compromise between effectiveness and relatively simple production, with the oblique stop surface 15 and the oblique pressing surface 16 being arranged annularly circumferentially and parallel to one another.

FIGS. 1, 3, 7 and 8 show that the contact fingers 11, in a continuation of the curved or angled projection 14, run in a straight line and parallel to the longitudinal center axis of the cable gland in their starting position. However, it would be feasible for said contact fingers to also already have a starting position which is slightly oblique and approximates the cable profile.

The free ends 12 of the contact fingers 11 are deformed, angled or bent away from the longitudinal center of the cable gland 1 in order to allow good contact with the shielding braid of the region 3, as illustrated in FIG. 6.

The support or ring 13 is in the form of a sleeve which connects the contact fingers 11 to one another and which is fastened to or mounted in the region of the clamping insert 4 which faces it in front of the oblique stop surface 15 and also in front of the oblique pressing surface 16 in the relative insertion direction of the cable 2. In this case, this ring or support 13 can be fixedly connected to the clamping insert 4 according to FIG. 7 by a clamping and/or latching and/or snap-action connection or by adhesive bonding or in another suitable form, again fixedly, but, according to FIG. 8, said ring or support can also be in the form of a loose plug part which can be inserted into the screw sleeve 9 between its projection 18 and the clamping insert 4 when mounted in the order shown in FIG. 8. This design according to FIG. 7 or 8 makes it possible to combine a clamping insert 4 which is composed of electrically non-conductive material with contact fingers 11 and their support 13 which are composed of electrically conductive material, so that the desired contact-connection is established in the use position.

FIGS. 1 and 3 further show a distance 20 between the end face of the screw sleeve 9 which faces the union nut 7 and an inner projection 19 of the clamping insert 4, said distance allowing the desired relative movement between the clamping insert 4 and the screw sleeve 9 and disappearing after the union nut is tightened according to FIG. 5. This point therefore also acts as an axial stop. In this case, the size of the projection 20 in the axial direction is such that the oblique surfaces 15 and 16 can move closer as required to a sufficient extent or to such an extent that only the straightened deformable projection 14 is still present between said surfaces, and the distance 17 originally provided there has disappeared.

The cable gland 1 for a shielded cable 2 has, in the usual manner, a screw sleeve 9 and a clamping insert 4 which engages in said screw sleeve, and also a union nut 7 or pressing screw which acts in the axial and radial directions on that region of the clamping insert 4 which projects beyond the screw sleeve 9 and radially deforms the clamping region or clamping fingers 6 of said clamping insert. In this case, the screw sleeve 9 contains a contact device 10 having one or more contact fingers 11 which bear against the shielding of the cable 2 in a contact-making manner in the use position. The contact device 10 has a support or ring 13, which is arranged in the screw sleeve 9 in the use position, and has the resilient contact finger or fingers 11, with said contact fingers 11 each having, adjacent to their support or ring 13 in the axial direction, a deformable projection 14 having a convex curvature or an angled form in longitudinal section in the starting position, and, in a continuation from said projection, running approximately in the orientation direction of the cable 2, that is to say in its relative insertion direction, in accordance with a corresponding bending operation. A stop surface 15, which runs in an inclined or oblique manner, is provided in the region of the projection 14 for engaging beneath the projection 14, and a pressing surface 16, which faces and acts on said projection 14 in the use position, is provided directly or indirectly on the clamping insert 4, it being possible to deform the curved or angled projection 14 so as to straighten it by reducing the distance between the stop surface 15 and the pressing surface 16, as a result of which the clamping fingers 11 are pivoted radially in the direction of the cable 2 on account of their being supported on the edge of the projection 18.

The invention claimed is:

1. A cable gland (1) for a shielded cable (2), comprising a screw sleeve (9) and a clamping insert (4) which engages in said screw sleeve, and a union nut (7) or pressing screw for acting on the clamping insert (4) in axial and radial directions and for radially deforming a clamping region or clamping fingers (6) of said clamping insert, a contact device (10) having at least one or having a plurality of contact fingers (11) which are distributed over a circumference provided in the screw sleeve (9), at least a portion of a longitudinal extent of said contact fingers bearing against shielding of the cable (2) in a use position, the contact device (10) has at least one support or ring (13), which is arranged in the screw sleeve (9), and at least one or more of the resilient contact fingers (11) proceed from said support or ring and, adjacent to the support or ring (13) in the axial direction, have a deformable projection (14) having a convex curvature or an angled form in longitudinal section in a starting position, and, in a continuation from said projection, run approximately in an insertion direction of the cable (2), and in that a stop surface (15), which extends radially inward and, in the process, in a relative insertion direction of the cable (2) in a manner inclined or obliquely with respect to said cable, for the projection of the contact finger or fingers (11) is provided in a region of the deformable projection (14) and engages beneath or behind said deformable projection against a direction of action of the union nut (7) or pressing screw, and the clamping insert (4) or a pressing ring which is acted on by said clamping insert has, on an end face which faces the deformable projection (14) of the contact finger/fingers (11), a pressing surface (16) which is arranged obliquely to a longitudinal center axis of the cable gland (1) and by which, when the clamping insert (4) is acted on in the axial direction and pushed in, the curved or angled deformable projection (14) of the contact finger (11) can be acted on that side thereof which is averted from the stop surface (15), and is deformable in such a way that it is movable closer to or pressed against the oblique stop surface (15) or the pressing surface (16), as a result of which a free part of the contact finger/fingers (11) which continues the deformable projection (14) is pivoted radially inward in a direction of the longitudinal center axis of the cable gland (1) and pressed against an inserted cable (2) or the shielding (3) of said cable.

2. The cable gland as claimed in claim 1, wherein the region of the deformable projection (14) of the contact finger/fingers (11) is located at a distance (17) from the stop surface (15) or from the pressing surface (16) in the starting position, and first is contacted or acted on by the pressing surface (16) or by the stop surface (15) when the union nut (7) or the pressing screw is tightened.

3. The cable gland as claimed in claim 1, wherein the stop surface (15) is provided on an inner projection (18), ring or on a protrusion or collar of the screw sleeve (9) which is connected fixedly or integrally to the screw sleeve (9) at least in a relative axial insertion direction of the cable (2).

4. The cable gland as claimed in claim 1, wherein the pressing surface (16) is directly integrally formed on an end face of the clamping insert (4).

5. The cable gland as claimed in claim 1, wherein the stop surface (15) or the pressing surface (16) is straight in longitudinal section.

6. The cable gland as claimed in claim 1, wherein the stop surface (15) and the pressing surface (16) are arranged annularly circumferentially and parallel to one another.

7. The cable gland as claimed in claim 1, wherein the contact fingers (11), in a continuation of the deformable projection (14), run in a straight line and parallel to the longitudinal center axis of the cable gland (1) in the starting position.

8. The cable gland as claimed in claim 1, wherein free ends (12) of the contact fingers (11) are deformed, angled or bent away from the longitudinal center of the cable gland (1).

9. The cable gland as claimed in claim 1, wherein the support or ring (13) which has the contact fingers (11) is formed as a lug or a sleeve which connects the contact fingers (11) to one another and which is fastened to or mounted in a region of the clamping insert (4) which faces it in front of the stop surface (15) and in front of the pressing surface (16) in the insertion direction of the cable (2).

10. The cable gland as claimed in claim 1, wherein the support or ring (13) which is fitted with the contact fingers (11) is connected to the clamping insert (4) by at least one of a clamping, latching, or snap-action connection or by adhesive bonding.

11. The cable gland as claimed in claim 1, wherein the clamping insert (4) has a coaxial or concentric groove in an end region thereof which faces the support or ring (13) of the contact fingers (11), said groove accommodates the support or ring (13), which is fitted with the contact fingers (11), in a clamping manner or latching manner or by a snap-action connection.

12. The cable gland as claimed in claim 1, wherein the support or ring (13) having the contact fingers (11) is flat before mounting and is insertable into the cable gland (1) in the manner of a ring when mounted.

13. The cable gland as claimed in claim 1, wherein at least one of the stop surface (15) or the pressing surface (16) is curved in a longitudinal section.

* * * * *